(12) United States Patent
Tian et al.

(10) Patent No.: US 11,418,810 B2
(45) Date of Patent: Aug. 16, 2022

(54) METHODS OF INTER PICTURE MOTION PREDICTION FOR MULTI-VIEW VIDEO COMPRESSION

(71) Applicant: TENCENT AMERICA LLC, Palo Alto, CA (US)

(72) Inventors: Jun Tian, Palo Alto, CA (US); Shan Liu, Palo Alto, CA (US); Xiaozhong Xu, Belle Mead, NJ (US); Weiwei Feng, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/026,922

(22) Filed: Sep. 21, 2020

(65) Prior Publication Data
US 2022/0094978 A1 Mar. 24, 2022

(51) Int. Cl.
| | |
|---|---|
| *H04N 19/597* | (2014.01) |
| *H04N 19/577* | (2014.01) |
| *H04N 19/176* | (2014.01) |
| *H04N 19/172* | (2014.01) |
| *H04N 19/167* | (2014.01) |
| *H04N 19/139* | (2014.01) |
| *H04N 19/105* | (2014.01) |
| *H04N 19/61* | (2014.01) |
| *H04N 19/52* | (2014.01) |

(52) U.S. Cl.
CPC ......... *H04N 19/597* (2014.11); *H04N 19/105* (2014.11); *H04N 19/139* (2014.11); *H04N 19/167* (2014.11); *H04N 19/172* (2014.11); *H04N 19/176* (2014.11); *H04N 19/52* (2014.11); *H04N 19/577* (2014.11); *H04N 19/61* (2014.11)

(58) Field of Classification Search
CPC .... H04N 19/597; H04N 19/577; H04N 19/52; H04N 19/61; H04N 19/176; H04N 19/172; H04N 19/167; H04N 19/139; H04N 19/105
See application file for complete search history.

(56) References Cited

U.S. PATENT DOCUMENTS

2007/0236578 A1 * 10/2007 Nagaraj ............ H04N 5/23264
348/208.99
2014/0078250 A1 3/2014 Zhang et al.
(Continued)

OTHER PUBLICATIONS

International Search Report dated Aug. 16, 2021 in International Application No. PCT/US21/33160.
(Continued)

*Primary Examiner* — Anner N Holder
(74) *Attorney, Agent, or Firm* — Sughrue Mion, PLLC (57) ABSTRACT

A method, computer program, and computer system is provided for coding video data. Video data including (1) a first frame comprising a first current view and a first reference view and (2) a second frame comprising a second current view and a second reference view is received. A co-located block in the first reference view is identified for a current block in the first current view. A predicted offset vector is calculated based on the motion vector between the co-located block and its reference block in the second reference view. The video data is encoded/decoded based on the predicted offset vector.

18 Claims, 6 Drawing Sheets

(56) References Cited

U.S. PATENT DOCUMENTS

| | | | |
|---|---|---|---|
| 2014/0086325 A1* | 3/2014 | Chen | H04N 19/61 375/240.14 |
| 2014/0161186 A1 | 6/2014 | Zhang et al. | |
| 2015/0382009 A1* | 12/2015 | Chen | H04N 19/523 375/240.16 |
| 2016/0309186 A1* | 10/2016 | Chen | H04N 19/597 |
| 2016/0323597 A1* | 11/2016 | Takehara | H04N 19/172 |
| 2016/0360226 A1* | 12/2016 | Fishwick | H04N 19/172 |
| 2017/0324978 A1* | 11/2017 | Xu | H04N 19/176 |
| 2018/0007388 A1 | 1/2018 | Sung et al. | |
| 2020/0007864 A1* | 1/2020 | Li | H04N 19/52 |
| 2020/0137415 A1* | 4/2020 | Esenlik | H04N 19/51 |

OTHER PUBLICATIONS

Written Opinion of the International Searching Authority dated Aug. 16, 2021 in International Application No. PCT/US21/33160.

Xiaozhong Xu, et al., "Fast Disparity Motion Estimation in MVC Based on Range Prediction", IEEE, ICIP, 2008, pp. 2000-2003.

Xiaozhong Xu, et al., "Improvements on Fast Motion Estimation Strategy for H.264/AVC", IEEE Transactions on Circuits and Systems for Video Technology, Mar. 2008, pp. 285-293, vol. 18, No. 3.

Benjamin Bross, et al., "Versatile Video Coding (Draft 2)", JVET-K1001-v6, Joint Video Experts Team (JVET) of ITU-T SG 16 WP 3 and ISO/IEC JTC 1/SC 29/WG 11, 11th Meeting, Jul. 10-18, 2018, 139 pages, Ljubljana, SI.

Benjamin Bross, et al., "General Video Coding Technology in Responses to the Joint Call for Proposals on Video Compression with Capability beyond HEVC", IEEE Transactions on Circuits and Systems for Video Technology, IEEE, 2019, pp. 1-16.

Shan Liu, et al., "Hybrid global-local motion compensated frame interpolation for low bit rate video coding", Journal of Visual Communication & Image Representation, 2003, pp. 61-79, vol. 14.

Shan Liu, et al., "Non-linear Motion-compensated Interpolation for Low Bit Rate Video", Proceedings of Spie, Applications of Digital Image Processing XXIII, 2000, pp. 203-213, vol. 4115.

\* cited by examiner

METHODS OF INTER PICTURE MOTION PREDICTION FOR MULTI-VIEW VIDEO COMPRESSION

FIELD

This disclosure relates generally to field of data processing, and more particularly to video encoding and decoding.

BACKGROUND

Block based motion compensation is typically used in modern video coding systems, such as in MPEG-2, MPEG-4, AVC, HEVC and VVC. The predictor of the current coding block comes from a previously coded picture, referred as a reference picture. A motion vector is used to point to the location in the reference picture, relative to the location of current block in the current picture. If more than one reference picture can be used for generating the predictor, the motion information may contain additionally the reference picture index, as a selection index from the candidate reference picture sets. In some prediction schemes, more than one prediction block may be used to generate the final predictor for the current block, such as, in the bi-directional prediction method.

For each inter-predicted CU (coding unit, or coding block), motion parameters consisting of motion vectors, reference picture indices and reference picture list usage index, and additional information may be needed for the new coding features of VVC for inter-predicted sample generation. The motion parameter can be signaled in an explicit or implicit manner. When a CU is coded with skip or merge mode, the CU is associated with a set of inferred motion information and has no significant residual coefficients, no coded motion vector delta or reference picture index. A merge mode is specified whereby the motion parameters for the current CU are inferred and obtained from neighboring CUs, including spatial and temporal candidates. The merge mode can be applied to any inter-predicted CU, not only for skip mode. The alternative to merge mode is the explicit transmission of motion parameters, where motion vector (or motion vector difference after prediction), corresponding reference picture index for each reference picture list and reference picture list usage flag and other needed information are signaled explicitly per each CU.

SUMMARY

Embodiments relate to a method, system, and computer readable medium for coding video data. According to one aspect, a method for coding video data is provided. The method may include receiving video data including (1) a first frame comprising a first current view and a first reference view and (2) a second frame comprising a second current view and a second reference view is received. A co-located block in the first reference view is identified for a current block in the first current view. A predicted offset vector is calculated based on the motion vector between the co-located block and its reference block in the second reference view. The video data is encoded/decoded based on the predicted offset vector.

According to another aspect, a computer system for coding video data is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving video data including (1) a first frame comprising a first current view and a first reference view and (2) a second frame comprising a second current view and a second reference view is received. A co-located block in the first reference view is identified for a current block in the first current view. A predicted offset vector is calculated based on the motion vector between the co-located block and its reference block in the second reference view. The video data is encoded/decoded based on the predicted offset vector.

According to yet another aspect, a computer readable medium for coding video data is provided. The computer readable medium may include one or more computer-readable storage devices and program instructions stored on at least one of the one or more tangible storage devices, the program instructions executable by a processor. The program instructions are executable by a processor for performing a method that may accordingly include receiving video data including (1) a first frame comprising a first current view and a first reference view and (2) a second frame comprising a second current view and a second reference view is received. A co-located block in the first reference view is identified for a current block in the first current view. A predicted offset vector is calculated based on the motion vector between the co-located block and its reference block in the second reference view. The video data is encoded/decoded based on the predicted offset vector.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to video encoding and decoding. The following described exemplary embodiments provide a system, method and computer program to, among other things, code video data based on motion vector prediction between frames of the video data. Therefore, some embodiments have the capacity to improve the field of computing by improved coding of video data based on inter-frame prediction.

As previously described, for each inter-predicted CU (coding unit, or coding block), motion parameters consisting of motion vectors, reference picture indices and reference picture list usage index, and additional information may be needed for the new coding features of VVC for inter-predicted sample generation. The motion parameter can be signaled in an explicit or implicit manner. When a CU is coded with skip or merge mode, the CU is associated with a set of inferred motion information and has no significant residual coefficients, no coded motion vector delta or reference picture index. A merge mode is specified whereby the motion parameters for the current CU are inferred and obtained from neighboring CUs, including spatial and temporal candidates. The merge mode can be applied to any inter-predicted CU, not only for skip mode. The alternative to merge mode is the explicit transmission of motion parameters, where motion vector (or motion vector difference after prediction), corresponding reference picture index for each reference picture list and reference picture list usage flag and other needed information are signaled explicitly per each CU.

In traditional methods, multiple views of the same scene are stitched into one signal video frame. The stitched video can therefore be coded using a conventional 2-D video codec, such as AVC, HEVC, etc. However, in such an approach, coding of the oversized pictures requires huge computational complexity increase. Typically, for inter motion estimation, a general assumption is that the object moves from a reference picture to a current picture smoothly with continuous motion. Therefore, the best matching block in a reference picture would appear around a projected center, which can be with similar coordinates as the current block in the current picture. Many motion search algorithms were designed in the literature in a way that more emphasis have been placed near the search center while less search efforts have been spent when moving away from the center. It may be advantageous, therefore, utilize the similarities among the stitched views inside the same picture, as well as across the pictures, to improve the coding efficiency and speed. In this way, inter motion estimation may be used to efficiently find the best matching blocks in the context of multi-view video coding.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

Figure 1:
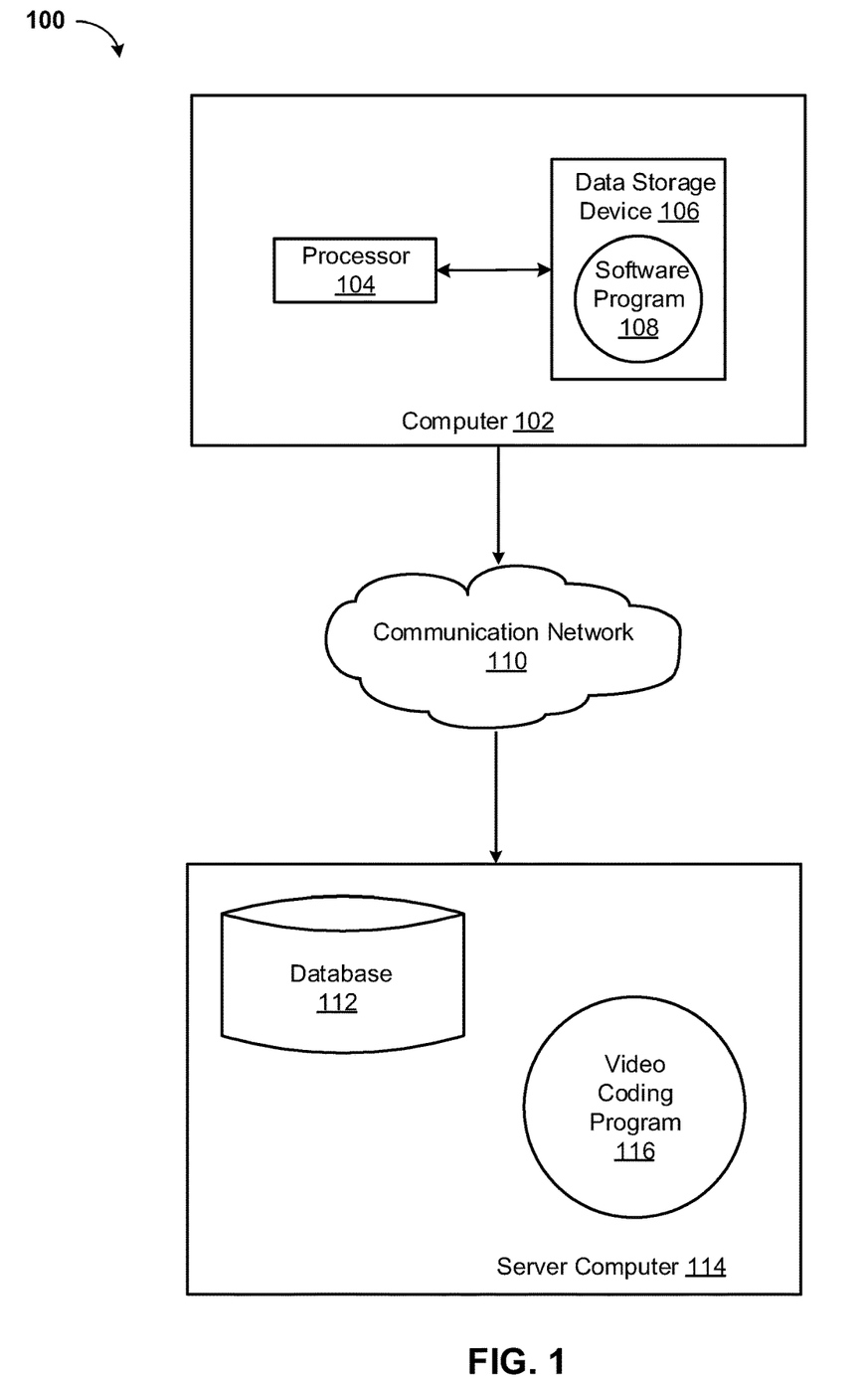
FIG. 1 illustrates a networked computer environment according to at least one embodiment.

Referring now to FIG. 1, a functional block diagram of a networked computer environment illustrating a video coding system 100 (hereinafter "system") for coding video data based on motion vector prediction between frames of the video data. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 4 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 5 and 6. The server computer 114 may also be located in a cloud computing deployment model, such as a private cloud, community cloud, public cloud, or hybrid cloud.

The server computer 114, which may be used for coding video data is enabled to run a Video Coding Program 116 (hereinafter "program") that may interact with a database 112. The Video Coding Program method is explained in more detail below with respect to FIG. 3. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger video coding program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
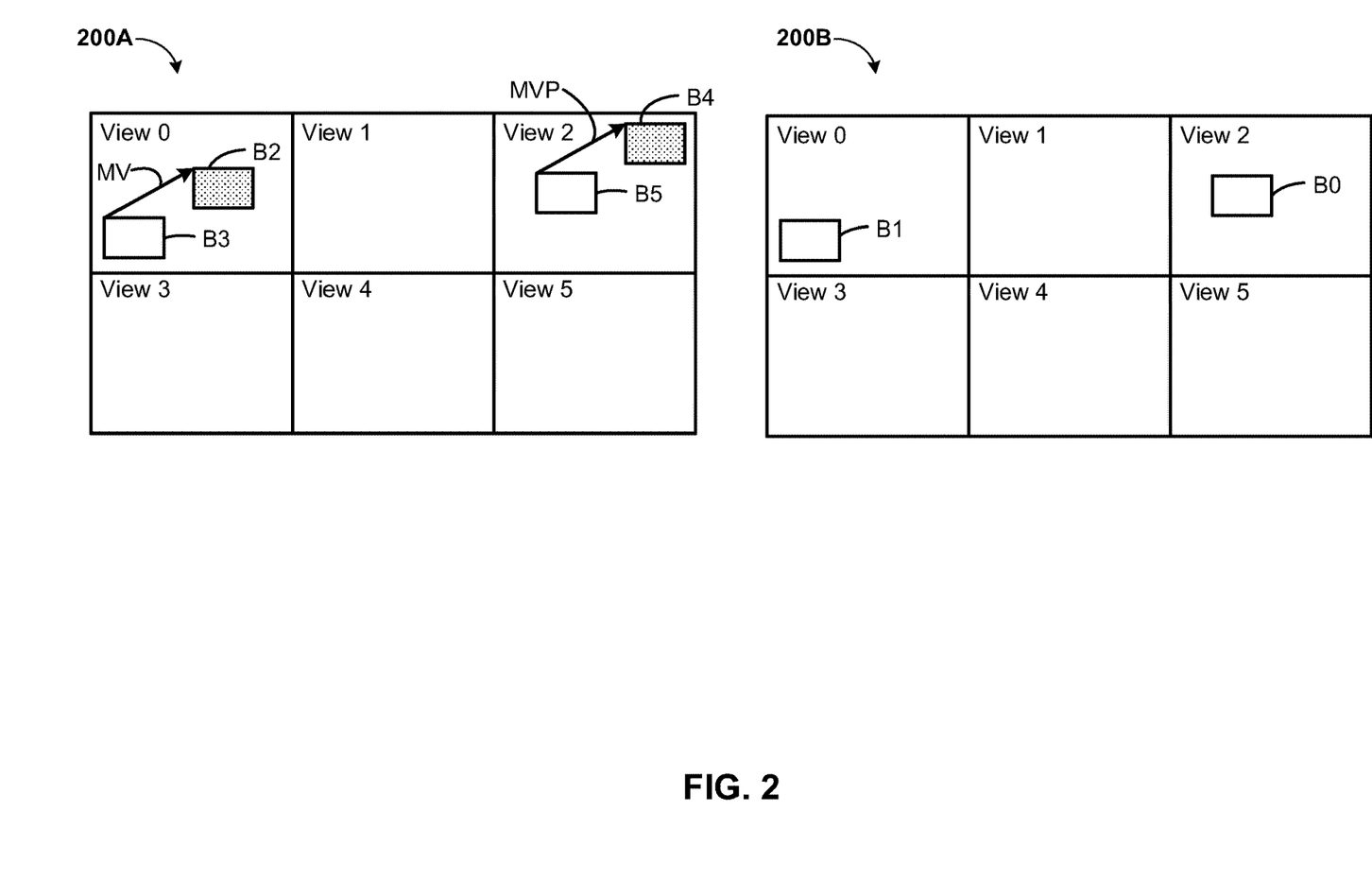
FIG. 2 is a diagram of frames of stitched video data each having multiple views, according to at least one embodiment.

Referring now to FIG. 2, a diagram of frames of stitched video data 200A and 200B is depicted. Stitched video data 200A and 200B may include several views (View 0 through View 5) spatially stitched together to form a two-dimensional image. By way of example, and not of limitation, six views are depicted in FIG. 2. However, it may be appreciated that any number of views may be stitched together. It may be further appreciated that there may be several ways to spatially stitch the views. For example, for six views, one, two, or three views may be stitched per row, which may yield a 1×6 stitching, a 2×3 stitching, and 3×2 stitching, respectively. For a multi-view video, the views may be stitched with a raster scanning order, either horizontally, or vertically, a zigzag scanning order, or with other scanning orders, such as a snake scanning order.

The stitching may be designed such that the resulting super-sized picture may have a desirable picture size. For example, the super-sized picture may be close to a square shape, a 4:3 aspect ratio rectangular shape, a 16:9 aspect ratio rectangular shape, etc. A frame resolution for each view may be W×H, where W and H may be the width and height of the view frame resolution, respectively. In a case where the super-sized picture may be close to a square shape, the factoring pair (L, M) of N, where N=L*M is the number of views, may be searched, such that |W*L−H*M| may be minimized. The minimizer may be denoted as ($L_0$, $M_0$), and $L_0$ views may be stitched per row. This may yield a $L_0$*$M_0$ stitching, with the super-sized picture size of width $W*_0$ and height $H*M_0$.

For a P slice or B slice in a super-sized picture, the motion vector from previous coded views in the same picture will be highly correlated to the one in the current view under coding. Thus, the motion vector from previous coded views in the same pictures are well suited for motion vector predictor (MVP) or the starting point in motion estimation for the current view. Furthermore, with the perspective transform between two views, a motion vector predictor may be calculated. When the camera intrinsic parameters may be identical across all views, the perspective transform from the reference view to the current view may be [R|t]. The perspective transform from the current view to the reference view may be [R'|−R't], where R may be the rotation matrix, t may be the translation value, and R' may be the transpose of R. The motion vector in the reference view may be written as a translation step [I|m], where I may be the identity matrix, and m may be the translation step. Thus, in the reference view, $$X_{cur} = [I|m]X_{ref},\quad\text{(Eq. 1)}$$

where $X_{cur}$ and $X_{ref}$ may be the blocks in the reference view of the current picture and of reference picture, respective. In the current view, $$Y_{cur} = [R|t]X_{cur} = [R|t][I|m]X_{ref} = [R|t][I|m][R'|-R't]Y_{ref} = [I|Rm]Y_{ref},\quad\text{(Eq. 2)}$$

where $Y_{cur}$ and $Y_{ref}$ may be the blocks in the current view of the current picture and of reference picture, respectively. $Y_{cur}$ may also be a translation of $Y_{ref}$, and the translation step (motion vector) may be Rm (i.e., the rotation matrix R multiplied by the translation step m).

For the general case where the camera intrinsic parameters may be different across views, the camera intrinsic matrix for the reference view and current view may be $K_{ref}$ and $K_{cur}$, respectively. Then, $$(K_{cur})^{-1}Y_{cur} = [R|t](K_{ref})^{-1}X_{cur} = [R|t][I|m](K_{ref})^{-1}X_{ref} =\quad\text{(Eq. 3)}$$
$$[R|t][I|m][R' - R't](K_{cur})^{-1}Y_{ref} = [I|Rm](K_{cur})^{-1}Y_{ref},$$

and, $$Y_{cur} = [I|Rm]Y_{ref},\quad\text{(Eq. 4)}$$

which implies that the translation step (motion vector) is still Rm, the rotation matrix R multiplied by the translation step m.

The translation step of the current view may be computed from the rotation matrix R and the translation step m of the reference view. In addition, the translation step of the current view may be independent of the translation value t of the cross-view perspective transform. The value of the translation step, Rm, may be used as the motion vector predictor for the current view.

A motion vector predictor candidate may be derived for a current block $B_0$ in the current view $V_{cur}$ of the current picture $P_{cur}$. Given the perspective transform from the current view $V_{cur}$ to a reference view $V_{ref}$, we assume its rotation matrix is $$R = \begin{pmatrix} r_{1,1} & r_{1,2} & r_{1,3} \\ r_{2,1} & r_{2,2} & r_{2,3} \\ r_{3,1} & r_{3,2} & r_{3,3} \end{pmatrix}.\quad\text{(Eq. 5)}$$

Under the perspective transform, the block $B_0$ in the current view $V_{cur}$ of the current picture $P_{cur}$ may map to a block $B_1$ in the reference view $V_{ref}$ of the current picture $P_{cur}$. If the motion vector for Block $B_1$ is (Mx, My), with its reference block $B_2$ residing in the same view $V_{ref}$ of a reference picture $P_{ref}$, one may yield:

$$X_2 = X_3 + Mx\quad\text{(Eq. 6)}$$

$$Y_2 = Y_3 + My,\quad\text{(Eq. 7)}$$

where ($X_2$, $Y_2$) are coordinates in the reference block $B_2$, and ($X_3$, $Y_3$) may be coordinates in the co-located block $B_3$ of $B_1$. Both $B_3$ and $B_1$ may be in the reference view $V_{ref}$, and $B_3$ may reside in the reference picture $P_{ref}$. A motion vector predictor candidate (Mxc, Myc) for Block $B_0$ in the current view $V_{cur}$ of the current picture $P_{cur}$ can be computed as:

$$\begin{pmatrix} Mxc \\ Myc \\ 0 \end{pmatrix} = R \begin{pmatrix} Mx \\ My \\ 0 \end{pmatrix} = \begin{pmatrix} r_{1,1} & r_{1,2} & r_{1,3} \\ r_{2,1} & r_{2,2} & r_{2,3} \\ r_{3,1} & r_{3,2} & r_{3,3} \end{pmatrix} \begin{pmatrix} Mx \\ My \\ 0 \end{pmatrix} \quad \text{(Eq. 8)}$$

$$Mxc = r_{1,1} * Mx + r_{1,2} * My \quad \text{(Eq. 9)}$$

$$Myc = r_{2,1} * Mx + r_{2,2} * My \quad \text{(Eq. 10)}$$

If $(X_4, Y_4)$ are coordinates in the co-located block $B_5$ of $B_0$, where $B_5$ may reside in the current view $V_{cur}$ of the reference picture $P_{ref}$, $(X_5, Y_5)$ are co-ordinates of a block $B_4$ ($B_4$ is the reference block of $B_0$), then $$X_5 = X_4 + Mxc = X_4 + r_{1,1} * Mx + r_{1,2} * My \quad \text{(Eq. 11)}$$

$$Y_5 = Y_4 + Myc = Y_4 + r_{2,1} * Mx + r_{2,2} * My \quad \text{(Eq. 12)}$$

The derived motion vector predictor candidate (Mxc, Myc) may be used as starting point when conducting motion search for Block $B_0$ in the current view.

Separately, a reference block can be derived in other views. When a current block of view 2 may be coded, a good match reference for this block may also be derived from views other than view 2 in the reference picture. For example, blocks in View 0 and View 1 may have already been coded prior to view 2.

A disparity vector DV(Dx, Dy) may be used to find the current block's collocated block in the same picture in the reference view, assuming samples in the block share the same disparity.

A location offset may be established between the current view and its reference view. For example, the offset may be two times of view width in x direction and 0 in y direction. The disparity vector may be added to such a view offset to find the collocated block in the reference view for the current block. The disparity vector can be derived using substantially any method. Since the collocated block indicated by the disparity vector in the reference view (view 0) may have been coded, its motion vector (if one exists) may point to a reference block in view 0 of the reference picture. The reference block may be used as a reference block for the current block (in view 2) as well, or serve as a starting point in motion estimation.

If the current block's location may be (Xcurr, Ycurr) and the derived reference block's location in the reference picture may be (Xref, Yref), then the suggested MV predictor may be: (Mxc, Myc)=(Xref, Yref)−(Xcurr, Ycurr).

A motion vector predictor can be used to improve motion vector difference coding. Similar to any of the above methods, the motion vector predictor candidate (Mxc, Myc) may be derived for block $B_0$ in the current view, using the existing block $B_1$'s motion information. (Mxc, Myc) can be either a List_0 or List_1 MV predictor.

After the encoder finds the real motion vector MV for coding, the difference MVD=MV−motion vector predictor may be coded. The above derived (Mxc, Myc) can be used as one of the possible motion vector prediction candidates.

At the decoder side, the motion vector predictor from above may be selected as the predictor, then the MVD may be decoded and added to the MVD to form the motion vector for the current block.

In one or more embodiments, the derived motion vector predictor candidate (Mxc, Myc) may be added to a merge candidate list for inter merge or skip mode. In one example, it may be placed after the spatial neighboring candidates.

In one or more embodiments, there may be multiple of such derived motion vector predictor candidates (Mxc, Myc) available, such as several derived motion vector predictor candidates from different views. The motion vector predictor candidates may be added to a merge candidate list for inter merge or skip mode together. In one example, they may be placed in the list where candidates of a closer view (to the current view) is placed prior to candidates of a further view.

In one or more embodiments, the derived motion vector predictor candidate (Mxc, Myc) may be added to a motion vector predictor candidate list for inter motion vector coding mode. In one example, it may be placed after the spatial neighboring candidates.

In one or more embodiments, the encoder performs motion estimation using the derived reference location indicated by (Mxc, Myc) as starting point, or search center and may continue to search around this location where more computational resources (e.g., more search points) are spent on locations near the center and less computational resources (e.g., less search points) for further locations.

In one or more embodiments, the encoder performs motion estimation using derived reference location indicated by (Mxc, Myc) as one of the probable best matching locations. If the matching result from this location returns with a sufficiently low cost, the motion estimation process can be early terminated without further checking inside the search window or checking more candidates.

In one or more embodiments, the encoder performs tile based encoding. Each view may be encoded as a tile and may be decoded as a tile. The method may include receiving video data including (1) a first frame comprising a first current tile and a first reference tile and (2) a second frame comprising a second current tile and a second reference tile is received. A co-located block in the first reference tile is identified for a current block in the first current tile. A predicted offset vector is calculated based on the motion vector between the co-located block and its reference block in the second reference tile. The video data is encoded/decoded based on the predicted offset vector.

In one or more embodiments, the encoder performs candidate motion vector index signaling, such as the signaling in HEVC.

In one or more embodiments, the encoder performs an ordered search among motion vector candidates, wherein the list of candidate vectors, when more than one is added, are ranked based on a proximity between the first current view and views corresponding to the candidate vectors, or based on the ranking of qualities in the reference views.

In one or more embodiments, the encoder performs a bi-prediction using both inter prediction and intra predication. The inter prediction may be a reference picture from lists of previously coded frames. The intra prediction may be a reference view in the same frame from a list of previously coded views.

Figure 3:
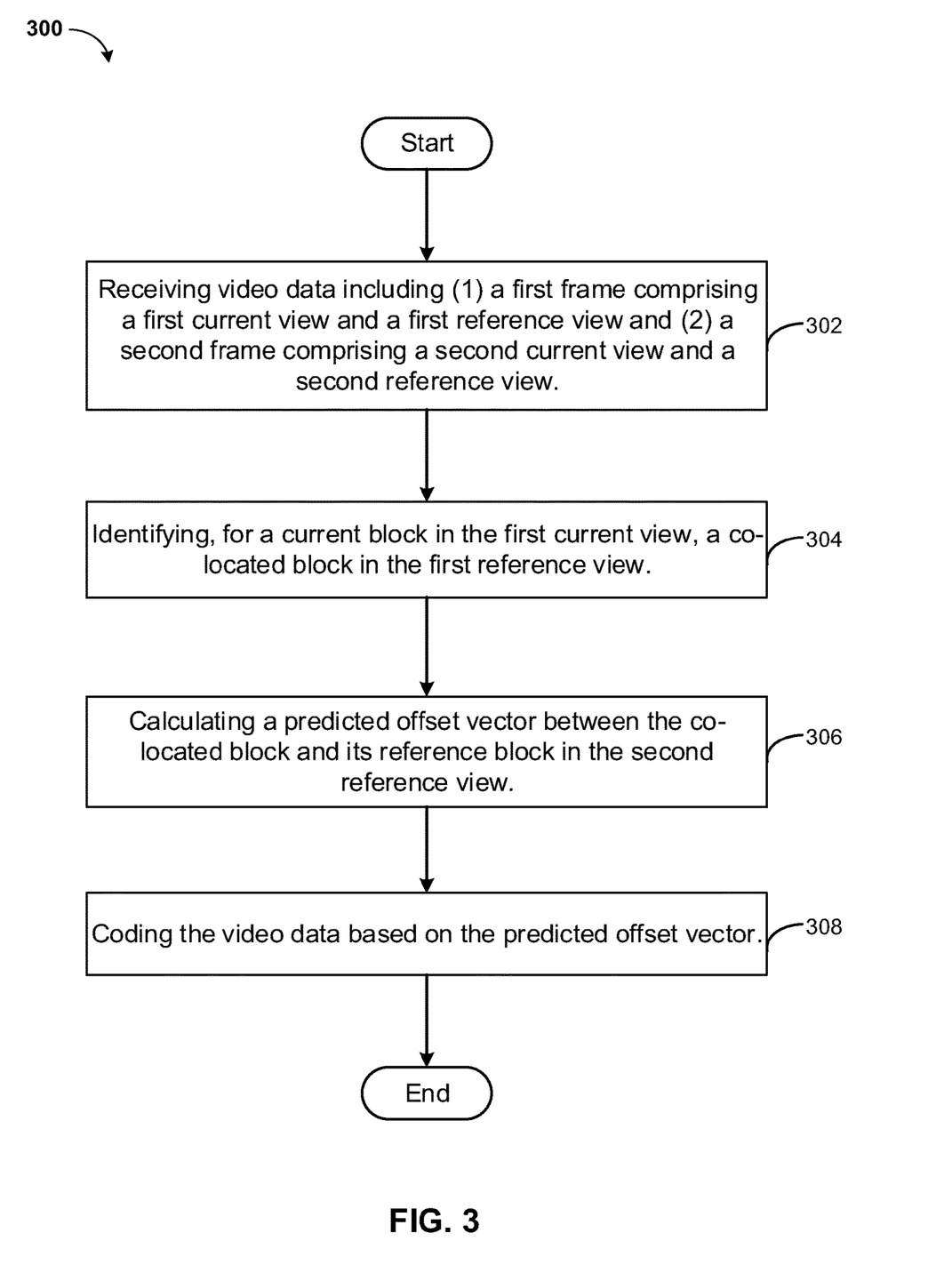
FIG. 3 is an operational flowchart illustrating the steps carried out by a program that codes video data, according to at least one embodiment.

Referring now to FIG. 3, an operational flowchart illustrating the steps of a method 300 for coding video data is depicted. In some implementations, one or more process blocks of FIG. 3 may be performed by the computer 102 (FIG. 1) and the server computer 114 (FIG. 1). In some implementations, one or more process blocks of FIG. 3 may be performed by another device or a group of devices separate from or including the computer 102 and the server computer 114.

At 302, the method 300 includes receiving video data including (1) a first frame comprising a first current view and a first reference view and (2) a second frame comprising a second current view and a second reference view.

At 304, the method 300 includes identifying, for a current block in the first current view, a co-located block in the first reference view.

At 306, the method 300 includes calculating a predicted offset vector based on the motion vector between the co-located block and its reference block in the reference view.

At 308, the method 300 includes coding the video data based on the predicted offset vector.

It may be appreciated that FIG. 3 provides only an illustration of one implementation and does not imply any limitations with regard to how different embodiments may be implemented. Many modifications to the depicted environments may be made based on design and implementation requirements.

Figure 4:
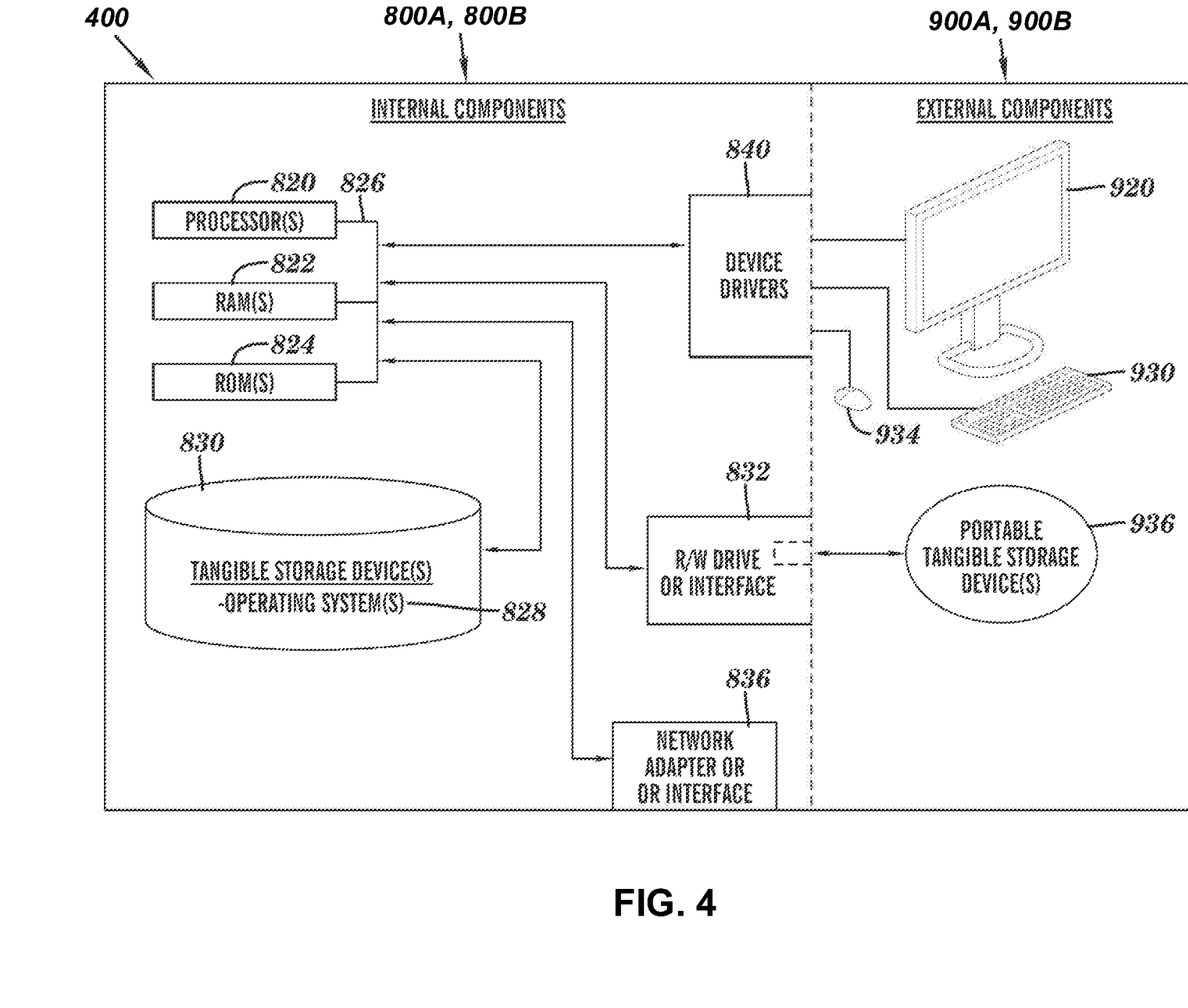
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment. It should be appreciated that FIG. 4 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 800A,B and external components 900A,B illustrated in FIG. 4. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Video Coding Program 116 (FIG. 1) on server computer 114 (FIG. 1) are stored on one or more of the respective computer-readable tangible storage devices 830 for execution by one or more of the respective processors 820 via one or more of the respective RAMS 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Video Coding Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Video Coding Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Video Coding Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
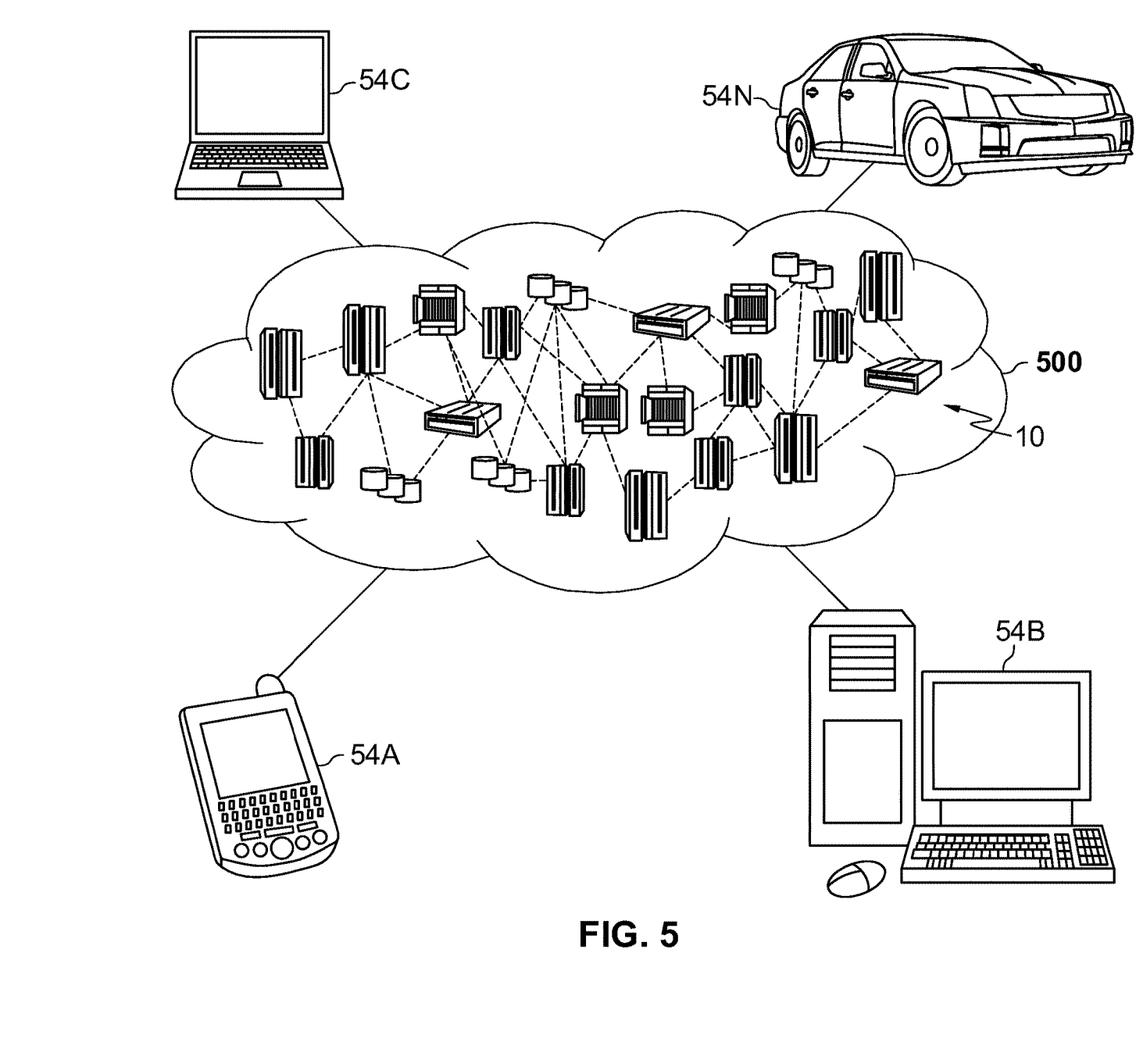
FIG. 5 is a block diagram of an illustrative cloud computing environment including the computer system depicted in FIG. 1, according to at least one embodiment.

Referring to FIG. 5, illustrative cloud computing environment 500 is depicted. As shown, cloud computing environment 500 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 500 can communicate with any type of computerized device over any type of network and/or network addressable connection (e.g., using a web browser).

Figure 6:
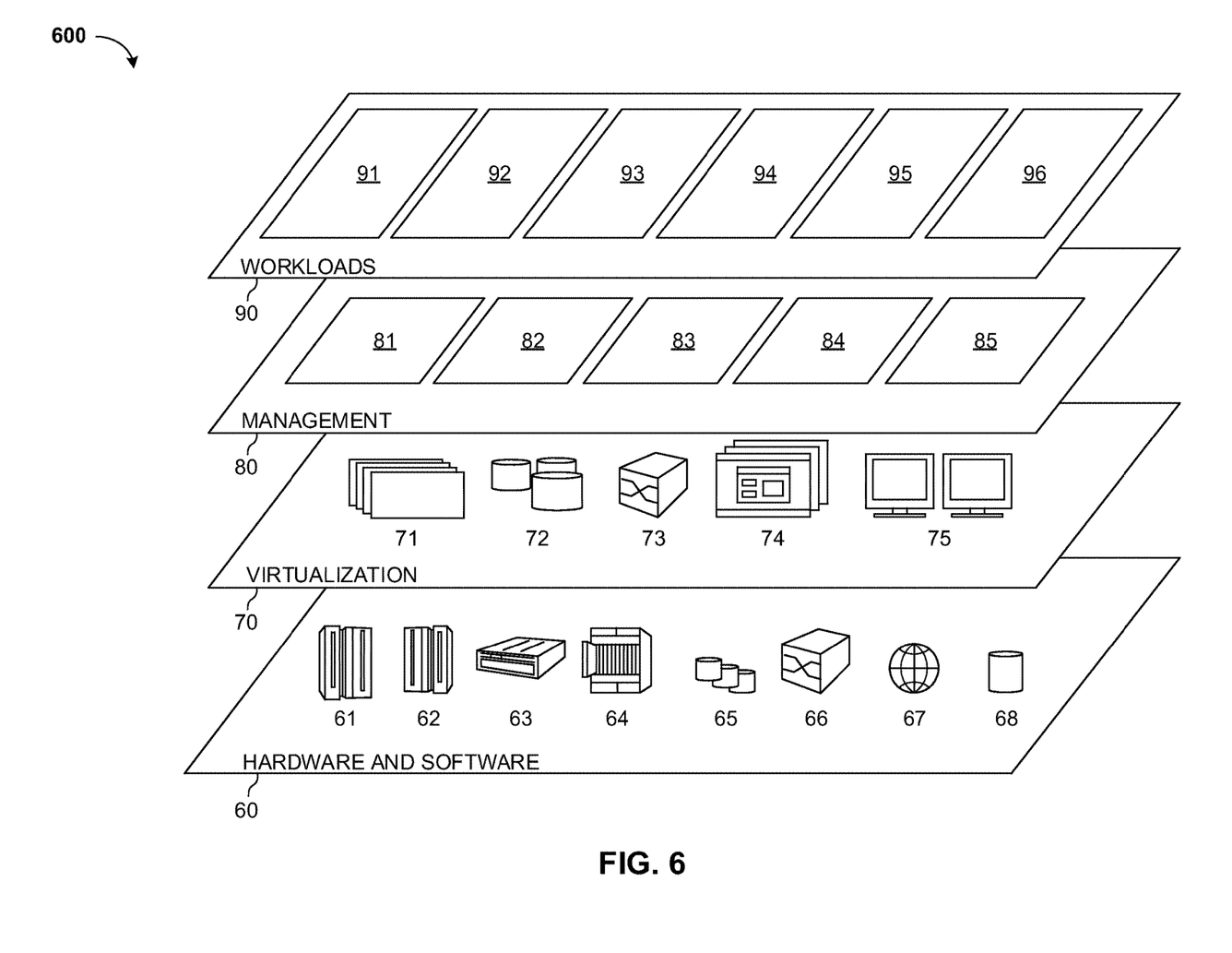
FIG. 6 is a block diagram of functional layers of the illustrative cloud computing environment of FIG. 5, according to at least one embodiment.

Referring to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Video Coding 96. Video Coding 96 may code video data based on motion vector prediction between frames of the video data.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of video coding, executable by a processor, the method comprising:
   receiving multi-view video data comprising (1) a first frame comprising a first current view and a first reference view and (2) a second frame comprising a second current view and a second reference view;
   identifying, for a current block in the first current view, a co-located block in the first reference view;
   calculating a predicted motion vector based on a motion vector of the co-located block in its reference picture in the second reference view (a second frame);
   adding the predicted motion vector to a list of candidate vectors for an inter merge mode or an inter skip mode, wherein the list of candidate vectors, when more than one is added, are ranked based on a proximity between the first current view and views corresponding to the candidate vectors; and
   coding the video data of the current block based on the predicted motion vector.

2. The method of claim 1, wherein the video data is coded based on predicting a location of the co-located block in the first reference view by applying a disparity vector, wherein the disparity vector is derived from a perspective transform to a current block in the first current view.

3. The method of claim 2, wherein an encoder performs motion estimation based on using the location indicated by the predicted motion vector as a probable matching location.

4. The method of claim 1, wherein the list of candidate vectors, when more than one is added, are ranked based on a ranking of qualities in the reference views.

5. The method of claim 1, wherein the predicted motion vector is added to a list of candidate vectors for an inter motion vector coding mode.

6. The method of claim 5, wherein the list of candidate vectors for the inter motion vector coding mode, when more than one is added, are ranked based on the proximity between the first current view and views corresponding to the candidate vectors, or based on the ranking of qualities in the reference views.

7. The method of claim 1, wherein an encoder performs motion estimation based on using anthe endpoint of the predicted motion vector as a search center.

8. The method of claim 1, the predicted motion vector is derived from applying a geometric transform of the motion vector of the co-located block.

9. A computer system for coding video data, the computer system comprising:
   one or more computer-readable non-transitory storage media configured to store computer program code; and
   one or more computer processors configured to access said computer program code and operate as instructed by said computer program code, said computer program code including:
      receiving code configured to cause the one or more computer processors to receive multi-view video data comprising (1) a first frame comprising a first current view and a first reference view and (2) a second frame comprising a second current view and a second reference view;
      identifying code configured to cause the one or more computer processors to identify, for a current block in the first current view, a co-located block in the first reference view;
      calculating code configured to cause the one or more computer processors to calculate a predicted motion vector based on a motion vector of the co-located block in its reference picture in the second reference view (a second frame);
      adding code configured to cause the one or more computer processors to add the predicted motion vector to a list of candidate vectors for an inter merge mode or an inter skip mode, and wherein the list of candidate vectors, when more than one is added, are ranked based on a proximity between the first current view and views corresponding to the candidate vectors; and
      coding code configured to cause the one or more computer processors to code the video data of the current block based on the predicted motion vector.

10. The computer system of claim 9, wherein the video data is coded based on predicting a location of the co-located block in the first reference view by applying a disparity vector, wherein the disparity vector is derived, from a perspective transform to a current block in the first current view.

11. The computer system of claim 10, wherein an encoder performs motion estimation based on using the location indicated by the predicted motion vector as a probable matching location.

12. The computer system of claim 9, wherein the list of candidate vectors, when more than one is added, are ranked based on a ranking of qualities in the reference views.

13. The computer system of claim 9, wherein the predicted motion vector is added to a list of candidate vectors for an inter motion vector coding mode.

14. The computer system of claim 9, wherein an encoder performs motion estimation based on using an endpoint of the predicted vector as a search center.

15. A non-transitory computer readable medium having stored thereon a computer program for coding video data, the computer program configured to cause one or more computer processors to:
   receive multi-view video data comprising (1) a first frame comprising a first current view and a first reference view and (2) a second frame comprising a second current view and a second reference view;
   identify, for a current block in the first current view, a co-located block in the first reference view;
   calculate a predicted motion vector based on a motion vector of the co-located block in its reference picture in the second reference view (a second frame);
   add the predicted motion vector to a list of candidate vectors for an inter merge mode or an inter skip mode, and wherein the list of candidate vectors, when more than one is added, are ranked based on a proximity between the first current view and views corresponding to the candidate vectors; and code the video data of the current block based on the predicted motion vector.

16. The computer readable medium of claim 15, wherein the video data is coded based on predicting a location of thea co-located block in the first reference view by applying a disparity vector, wherein the disparity vector is derived from a perspective transform to a current block in the first current view.

17. The computer readable medium of claim 16, wherein an encoder performs motion estimation based on using the location indicated by the predicted motion vector as a probable matching location.

18. The computer readable medium of claim 15, wherein the predicted motion vector is added to a list of candidate vectors for an inter vector coding mode.

\* \* \* \* \*